(12) United States Patent
Blackman et al.

(10) Patent No.: US 6,202,069 B1
(45) Date of Patent: Mar. 13, 2001

(54) EXECUTION PARADIGM FOR ACCESSING HIERARCHICAL DATA USING AN OBJECT FRAMEWORK

(75) Inventors: Kenneth Ray Blackman, San Jose; Shyh-Mei Fang Ho, Cupertino; Thomas Beavers Sander, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,071

(22) Filed: Apr. 30, 1998

(51) Int. Cl.$^7$ .................................................. G06F 17/00
(52) U.S. Cl. .......................... 707/103; 707/100; 707/101; 707/102
(58) Field of Search .................. 707/103, 4, 6, 707/8, 100, 101, 102, 26; 395/200.57, 701, 702, 500.34

(56) References Cited

U.S. PATENT DOCUMENTS

| | | | |
|---|---|---|---|
| 5,161,225 | 11/1992 | Abraham et al. | 707/103 |
| 5,212,787 | 5/1993 | Baker et al. | 707/103 |
| 5,291,583 | 3/1994 | Bapat | 395/500 |
| 5,295,256 | 3/1994 | Bapat | 395/500 |
| 5,297,279 | 3/1994 | Bannon et al. | 707/103 |
| 5,303,379 | 4/1994 | Khoyi et al. | 395/700 |
| 5,379,419 | 1/1995 | Heffernan et al. | 707/103 |
| 5,414,812 | 5/1995 | Filip et al. | 395/200 |
| 5,421,015 | 5/1995 | Khoyi et al. | 709/107 |
| 5,426,747 | 6/1995 | Weinreb et al. | 395/400 |
| 5,437,027 | 7/1995 | Bannon et al. | 707/103 |
| 5,459,860 | 10/1995 | Burnett et al. | 707/103 |
| 5,499,371 | 3/1996 | Henninger et al. | 395/700 |
| 5,542,078 | 7/1996 | Martel et al. | 707/103 |
| 5,765,161 * | 6/1998 | Blackman et al. | 707/103 |
| 5,781,739 * | 7/1998 | Bach et al. | 395/200.57 |
| 5,787,425 * | 7/1998 | Bigus | 707/6 |
| 5,799,313 * | 8/1998 | Blackman et al. | 707/103 |
| 5,878,411 * | 3/1999 | Burroughs et al. | 707/4 |
| 5,915,252 * | 6/1999 | Misheski et al. | 707/103 |
| 5,924,101 * | 7/1999 | Bach et al. | 707/103 |
| 5,930,795 * | 7/1999 | Chen et al. | 707/100 |
| 5,943,497 * | 8/1999 | Bohrer et al. | 395/701 |
| 5,983,233 * | 11/1999 | Potonniee | 707/103 |
| 5,987,242 * | 11/1999 | Bentley et al. | 395/500.34 |
| 5,987,247 * | 11/1999 | Lau | 395/702 |
| 6,014,637 * | 1/2000 | Fell et al. | 705/26 |
| 6,026,401 * | 2/2000 | Brealey et al. | 707/8 |
| 6,049,665 * | 4/2000 | Branson et al. | 395/702 |
| 6,070,165 * | 5/2000 | Whitmore | 707/101 |

FOREIGN PATENT DOCUMENTS

WO 9615491 * 5/1996 (WO).

OTHER PUBLICATIONS

Cross, "Towards a Unifying Framwork for a Fuzzy Object Model", IEEE, 1996, pp. 85–92.*

1. Muckenhaupt, Kenneth J., "Preserving Current Assets With Objects on MVS White Paper," Mar. 15, 1996, at http://www.s390.ibm.com/producst/wp/wrapwp.html.

2. IBM Corporation. "IMS in an Object Oriented World," San Jose, California, Jul. 12, 1995, pp. 1–53.

(List continued on next page.)

Primary Examiner—Wayne Amsbury
Assistant Examiner—Thuy Pardo
(74) Attorney, Agent, or Firm—Gates & Cooper

(57) ABSTRACT

A method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrapper the data retrieved from the database.

66 Claims, 5 Drawing Sheets

OTHER PUBLICATIONS

3. Howe III, Jack L., "IMS/OO—Overview:Objects in IMS Are Closer Than They Appear", IBM Corporation, Overheads from presentation at SHARE '95, Feb. 23, 1995.

4. Howe III, Jack L., "Objects in the IMS are Closer Than They Appear", IBM Corporation, Overheads from presentation at IBM Technical Interchange '95, May 20, 1995.

5. "Voyager/C++Client/Server Object Management System," Secant Technologies, Inc., 1995.

6. Ho, Shyh–Mei, "Object Access To IMS Data," IMS OO–Web Design/Development, IBM Santa Teresa Laboratory, San Jose, California, Overheads from presentation at SHARE'97, Mar. 1997.

7. "Get your Objects with IMS Database Object Technology," IBM Corporation., 1995, pp. 1–3.

8. "Objects in IMS Are Closer Than They Appear", IBM Corporation—IMS DBobject Services, Mar. 1, 1996.

9. "Object Collection Service," IBM Corporation, Feb. 9, 1996, pp. 1–134.

* cited by examiner

EXECUTION PARADIGM FOR ACCESSING HIERARCHICAL DATA USING AN OBJECT FRAMEWORK

CROSS-REFERENCE TO RELATED APPLICATIONS

This application is related to the following co-pending and commonly assigned patent applications:

Utility Application Ser. No. 09/070,274, now pending, entitled "A GENERIC EXECUTION MODEL FOR ISOLATING APPLICATIONS FROM UNDERLYING DATABASES," filed on same date herewith, by Kenneth R. Blackman, Shyh-Mei F. Ho, and Thomas Beavers Sander;

Utility Application Ser. No. 09/070,528, now pending, entitled "AN OBJECT-ORIENTED PROGRAMMING MODEL FOR ACCESSING HIERARCHICAL DATABASES," filed on same date herewith, by Bach Dinh Doan and Shyh-Mei F. Ho;

Utility Application Ser. No. 09/070,273, now pending, entitled "AN INTERNET-ENABLED GENERIC APPLICATION PROGRAM FOR ACCESSING HIERARCHICAL DATA," filed on same date herewith, by Bach Dinh Doan and Shyh-Mei F. Ho;

Utility Application Ser. No. 09/070,227, now pending, entitled "GENERATING AN INTERNET APPLICATION FOR ACCESSING A HIERARCHICAL DATABASE," filed on same date herewith, by Attila J. Fogarasi, Shyh-Mei F. Ho, Wai-Yee D. Ling, and Kevin M. McBride;

Provisional Application Ser. No. 60/067,292, now expired, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson;

Utility Application Ser. No. 09/042,238, now pending, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, which claims the benefit under 35 U.S.C. §119(e) of Provisional Application Ser. No. 60/067,292 above;

Utility Application Ser. No. 08/949,638, now U.S. Pat. No. 5,924,101, entitled "A USER INTERFACE FOR CREATING CLASS DEFINITIONS AND IMPLEMENTATIONS FOR DATABASE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander;

Utility Application Ser. No. 08/775,606, now U.S. Pat. No. 5,781,739, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara;

Utility Application Ser. No. 08/736,762, now U.S. Pat. No. 5,799,313, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III;

Utility Application Ser. No. 08/736,763, now U.S. Pat. No. 5,794,248, entitled "A METHOD FOR REPRESENTING NON-OBJECT-ORIENTED DATABASES USING A COLLECTION OF COLLECTIONS DATA MODEL," filed on Oct. 25, 1996, by Kenneth R. Blackman and Jack L. Howe III;

Utility Application Ser. No. 08/738,294, now U.S. Pat. No. 5,781,907, entitled "A METHOD FOR THE INCREMENTAL PRESENTATION OF NON-OBJECT-ORIENTED DATABASES USING AN OBJECT-ORIENTED QUERYABLE DATABASE COLLECTION," filed on Oct. 25, 1996, by Kenneth R. Blackman and Jack L. Howe III;

Utility Application Ser. No. 08/738,104, now U.S. Pat. No. 5,778,379, entitled "A QUERY SYNTAX FOR ACCESSING NON-RELATIONAL, NON-OBJECT-ORIENTED DATABASES," filed on Oct. 25, 1996, by Kenneth R. Blackman and Jack L. Howe III;

Utility Application Ser. No. 08/738,082, now U.S. Pat. No. 5,778,358, entitled "A QUERY PARSER FOR ACCESSING NON-RELATIONAL, NON-OBJECT-ORIENTED DATABASES," filed on Oct. 25, 1996, by Kenneth R. Blackman and Jack L. Howe III;

Utility Application Ser. No. 08/738,330, now U.S. Pat. No. 5,787,436, entitled "A METHOD FOR USING A DATABASE CURSOR FOR THE INCREMENTAL PRESENTATION OF QUERY RESULTS WHEN TRAVERSING IMPLIED COLLECTIONS IN NON-OBJECT-ORIENTED DATABASES," filed on Oct. 25, 1996, by Kenneth R. Blackman and Jack L. Howe III;

Utility Application Ser. No. 08/736,759, now U.S. Pat. No. 5,794,247, entitled "A METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III;

Utility Application Ser. No. 08/736,764, now U.S. Pat. No. 5,765,161, entitled "A METHOD FOR ENCAPSULATING DATA FROM NON-OBJECT-ORIENTED DATABASES AS DATABASE PERSISTENT OBJECTS," filed on Oct. 25, 1996, by Kenneth R. Blackman and Jack L. Howe III;

Utility Application Ser. No. 08/738,103, now U.S. Pat. No. 5,765,163, entitled "A METHOD FOR USING QUERYABLE PERSISTENT IDENTIFIERS TO LOCATE DATA FOR DATABASE PERSISTENT OBJECTS IN NON-OBJECT-ORIENTED DATABASES," filed on Oct. 25, 1996, by Kenneth R. Blackman and Jack L. Howe III;

Utility Application Ser. No. 08/736,983, now U.S. Pat. No. 5,761,671, entitled "A METHOD FOR INTERFACING QUERYABLE DATABASE PERSISTENT OBJECTS TO NON-RELATIONAL, NON-OBJECT-ORIENTED DATABASES," filed on Oct. 25, 1996, by Kenneth R. Blackman and Jack L. Howe III;

Utility Application Ser. No. 08/736,952, now U.S. Pat. No. 5,765,162, entitled "A METHOD FOR MANAGING QUERYABLE DATABASE PERSISTENT OBJECTS AND QUERYABLE DATABASE COLLECTIONS IN AN OBJECT-ORIENTED ENVIRONMENT," filed on Oct. 25, 1996, by Kenneth R. Blackman and Jack L. Howe III;

Utility Application Ser. No. 08/736,765, now U.S. Pat. No. 5,737,597, entitled "A METHOD FOR CATA- LOGING DATABASE CHARACTERISTICS AND DEFINING AND GENERATING DATABASE PERSISTENT OBJECTS," filed on Oct. 25, 1996, by Kenneth R. Blackman and Jack L. Howe III;

Utility Application Ser. No. 09/047,786, now pending, entitled "A METHOD FOR CATALOGING DATABASE CHARACTERISTICS AND DEFINING AND GENERATING DATABASE PERSISTENT OBJECTS," filed on Mar. 25, 1998, by Kenneth R. Blackman and Jack L. Howe III, which is a continuation of Utility Application Ser. No. 08/736,765 above;

Utility Application Ser. No. 08/736,922, now U.S. Pat. No. 5,809,508, entitled "A METHOD FOR CAPTURING AND CATALOGING DATABASE CHARACTERISTICS TO DEFINE DATABASE PERSISTENT OBJECTS," filed on Oct. 25, 1996, by Kenneth R. Blackman and Jack L. Howe III;

Utility Application Ser. No. 08/738,102, now U.S. Pat. No. 5,737,598, entitled "A METHOD FOR CAPTURING AND CATALOGING SPECIFICATIONS FOR DATABASE PERSISTENT CLASSES," filed on Oct. 25, 1996, by Kenneth R. Blackman and Jack L. Howe III;

Utility Application Ser. No. 08/738,105, now U.S. Pat. No. 5,809,509, entitled "A METHOD FOR USING A NON-OBJECT-ORIENTED DATABASE AS A GENERIC PERSISTENT DATABASE FOR PERSISTENT OBJECTS," filed on Oct. 25, 1996, by Kenneth R. Blackman and Jack L. Howe III; and Utility Application Ser. No. 08/736,761, now U.S. Pat. No. 5,764,979, entitled "A METHOD FOR CAPTURING AND CATALOGING PROGRAM CHARACTERISTICS FOR THE USAGE OF DATABASE PERSISTENT CLASSES," filed on Oct. 25, 1996, by Kenneth R. Blackman and Jack L. Howe III;

all of which applications are incorporated by reference herein.

BACKGROUND OF THE INVENTION

1. Field of the Invention

The present invention relates generally to computerized methods for accessing databases, and in particular, to a computerized method for accessing hierarchical data using an object-oriented framework.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs developed by object-oriented programming systems (OOPS). However, there are few tools available to assist OOPS developers.

One method for allowing object-oriented application programs to access data in an IMS™ database is through transaction wrappering, implemented in such products such as IBM's VisualAge™ IMS Connection. Transaction wrappering creates a class having methods that retrieve data from the IMS™ database, create an object embodying the retrieved data, and manipulate the object in an object-oriented application program. The problem with this approach is that each object-oriented application requires substantial additional coding, both object-oriented and non-object-oriented, before it is able to access the data in the IMS™ database.

Another approach to accessing data in a non-relational, non-object-oriented database is to translate the non-relational database to a relational database, and use existing object-oriented programming techniques developed for relational databases to access the data therein. The problem with this approach is that non-relational data, such as the hierarchical data found in an IMS™ database, does not map well to a relational database.

Thus, there is a need in the art for improved techniques for accessing hierarchical data using object-oriented frameworks.

SUMMARY OF THE INVENTION

To overcome the limitations in the prior art described above, and to overcome other limitations that will become apparent upon reading and understanding the present specification, the present invention discloses a method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrapper the data retrieved from the database.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention introduces a new execution paradigm for accessing hierarchical databases, such as an IMS™ database, by modeling the database into an objects framework and providing the mechanisms that allow object-oriented application programs to access the database data using standard tools, such as the DL/I™ query language for the IMS™ database. The objects framework instantiates IMS™ data objects upon demand from application programs and manages those objects from creation to deletion. Further, the objects framework uses these objects to dynamically construct DL/I™ calls from application program requests.

The objects framework can be used in a number of different environments, such as: (1) DL/I™ batch processing and (2) on-line transactions including both IMS™ and CICS™ transactions. Moreover, the objects framework can be executed in any MVS address space, including IMS and non-IMS address spaces, such as web server address spaces.

Thus, the present invention offers improved IMS™ application programming productivity by supporting IMS™ business objects and data objects, by eliminating complicated DL/I™ programming, and by supporting use of object-oriented programming tools.

Figure 1:
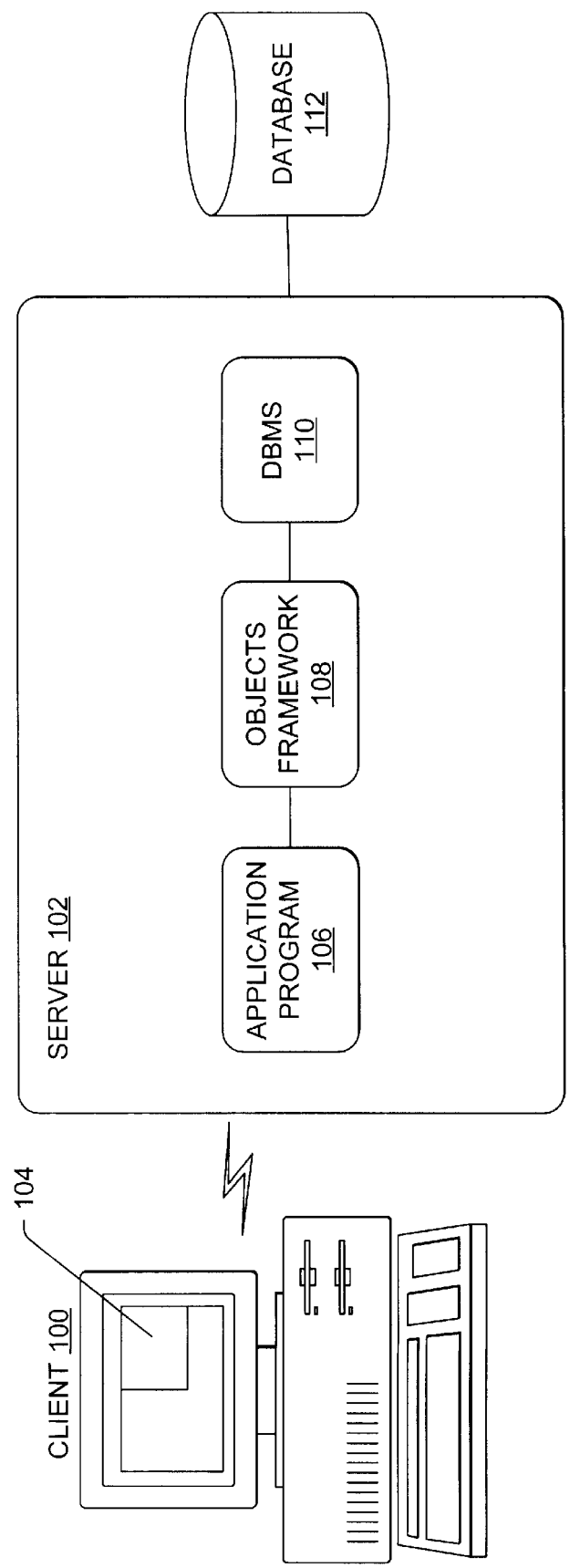
FIG. 1 is a block diagram illustrating an exemplary hardware environment used to implement the preferred embodiment of the present invention.

Hardware Environment FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
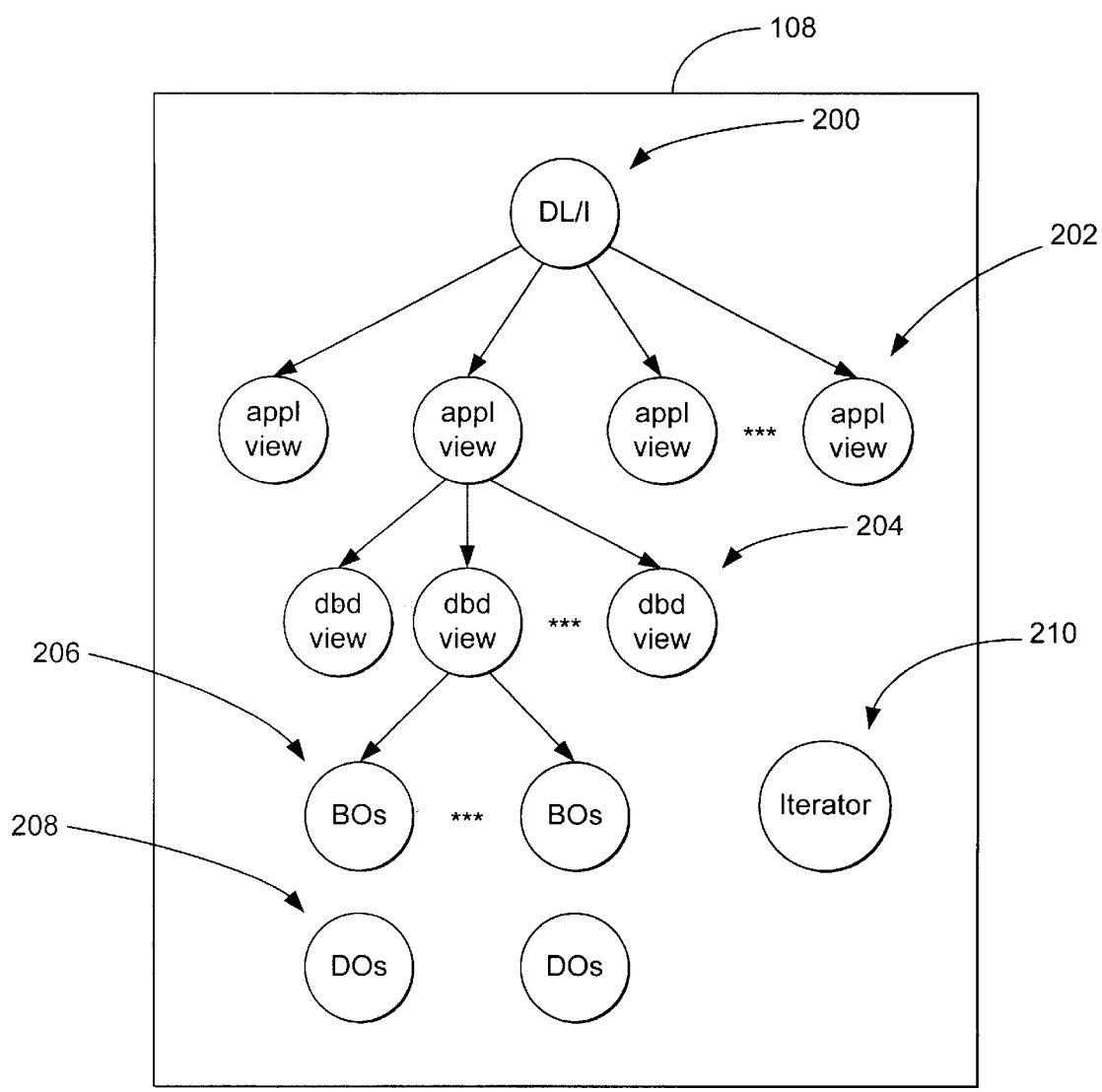
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system.

The objects framework 108 comprises a C++ class library that interfaces to the application program 106. The application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, and an iterator object 210.

The application program 106 first loads the objects framework 108 class library by instantiating a DL/I™ object 200, one applView object 202, and one dbdView object 204. The objects framework 108 then dynamically loads the class library for the BOs 206 and DOs 208 requested by the application program 106 to create an iterator object 210. The iterator object 210 then instantiates the BOs 206 and their corresponding DOs 208 during execution.

All the class objects, except the iterator class 210, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of the segments in the IMS™ database 112 and the record layouts, including formatting information for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A DO 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a BO 206 may be instantiated with a DO 208 to provide business logic for the application program 106. In such an embodiment, the application program 106 accesses the business logic via the BO 206, which in turns invokes the methods of its corresponding DO 208 to perform the necessary operations on the database 112, to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g. DB2™.

Iterator Object

In the objects framework 108, the application program 106 uses a DL/I™ query string to access the IMS™ database 112. The application program 106 first instantiates a desired applView object 202. If the associated DL/I™ object 200 has not been instantiated yet, this also results in its instantiation as the root of the objects framework 108 and the root for the collection of applView objects 202 in the IMS™ database 112. The application program 106 then provides the DL/I™ query string to an "evaluate" method of the applView object 202, and the applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 104. Using the pointer and "next" method of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the application program 106 to perform needed business logic on the associated DOs 208. In addition, the application program 106 can perform DL/I™ operations (e.g., retrieve, update, delete and insert) using methods of the BOs 206. The BO 206 will, in turn, invoke the methods of its corresponding DO 208 to perform actual DL/I calls.

The following methods exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDS ( )

UpdateToDS( )

InsertToDS( )

DeleteFromDS ( )

In a preferred embodiment, only the above four methods will result in actual I/O operations on the database 112.

Example Application Program

Following is a sample object-oriented application program 106 according to the present invention:

```
// application program
main()
{
    // instantiate desired applView object (and DL/I object if necessary)
    applView_SSM applView("applViewName");
    // instantiate iterator object and set pointer using applView object's
    //   "evaluate" method and query string
    iterator* ltr=applView.evaluate(queryString);
    // use "next" method to instantiate a BO and its associated DO
    BO*pObj=ltr->next();
    // use indicated methods to retrieve, update, or
    //   delete BOs and DOs
    pObj->RetrieveFromDS();
    pObj->UpdateToDS();
    pObj->DeleteFromDS();
    // use "newObject" method to instantiate new DO
    DO*pObj=ltr->newObject();
    // use indicated method to insert new DO
    pObj->InsertToDS();
}
```

Following is an example DL/I™ query string that could be used by the object-oriented application program 106 that accesses the database 112:

SELECT doClassNameC

FROM databaseViewName

WHERE doClassNameA.keyname relop keyvalue,
    doClassNameB.keyname relop keyvalue,
    doClassNameC.keyname relop keyvalue where "relop" is a relational operator, such as:

| EQ | or = or = |
| GT | or > or > |
| LT | or < or < |
| GE | or > = or = > |
| LE | or < = or = < |
| NE | or ! = or = ! |
| AND | or & or ∗ |
| OR | or | or + |

Logic of the Objects Framework

Figure 3:
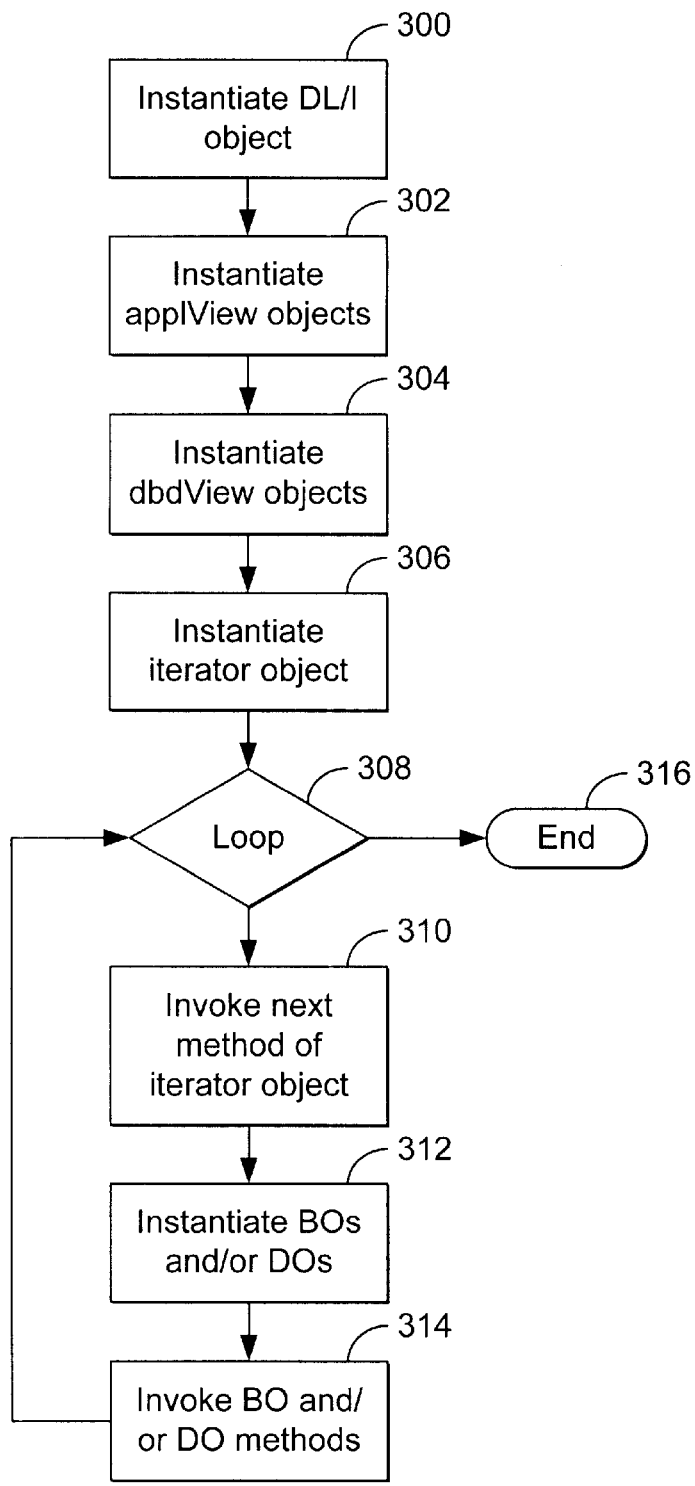
FIG. 3 is a flowchart illustrating the steps performed by the application program and objects framework according to the present invention.

FIG. 3 is a flowchart illustrating the steps performed by the application program 106 and objects framework 108 according to the present invention.

Block 300 represents the DL/I™ object 200 of the objects framework 108 being instantiated in the memory of the server computer 102. Usually, this occurs either when the objects framework 108 is loaded or when the application program 106 first requests an applView object 202.

Block 302 represents the application program 106 instantiating the requested applView object 202 in the memory of the server computer 102.

Block 304 represents the dbdView objects 204 of the objects framework 108 being instantiated in the memory of the server computer 102. Usually, this occurs either when the objects framework 108 is loaded or when the application program 106 first requests an appiView object 202.

Block 306 represents the application program 106 instantiating the iterator object 210 in the memory of the server computer 102 and then setting its object pointer by invoking the "evaluate" method with a DL/I query string.

Blocks 300–316 represent a loop that may be performed by the application program 108 to iterate through all the associated DOs 208 and/or BOs 206 in the collection.

Block 310 represents the application program 106 invoking the "next" member function or method of the iterator object 210 to instantiate/materialize the text DO 208 and/or BO 206 in the memory of the server computer 102.

Block 312 represents the iterator object 210 instantiating the requested DO 208 and/or BO 206 in the memory of the server computer 102.

Block 314 represents the application program 106 invoking the "getter", "setter", or other methods of the BOs 206 and/or DOs 208 to perform the desired functionality. Thereafter, control transfers back to Block 308.

Block 316 represents the end of the logic.

Class Definition Tool (CDT)

Figure 4:
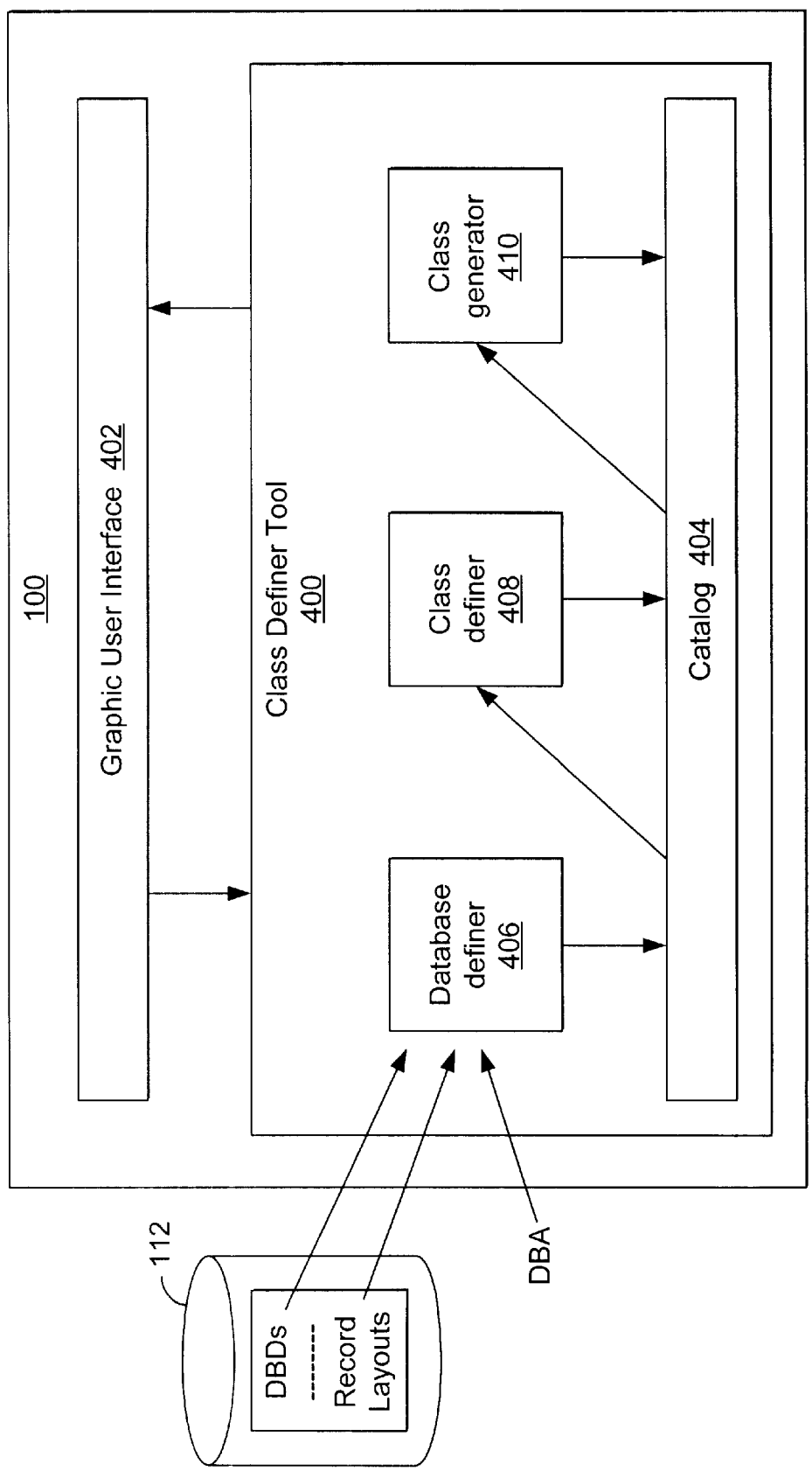
FIG. 4 is a block diagram illustrating the structure of a Class Definition Tool according to the present invention.
Figure 5:
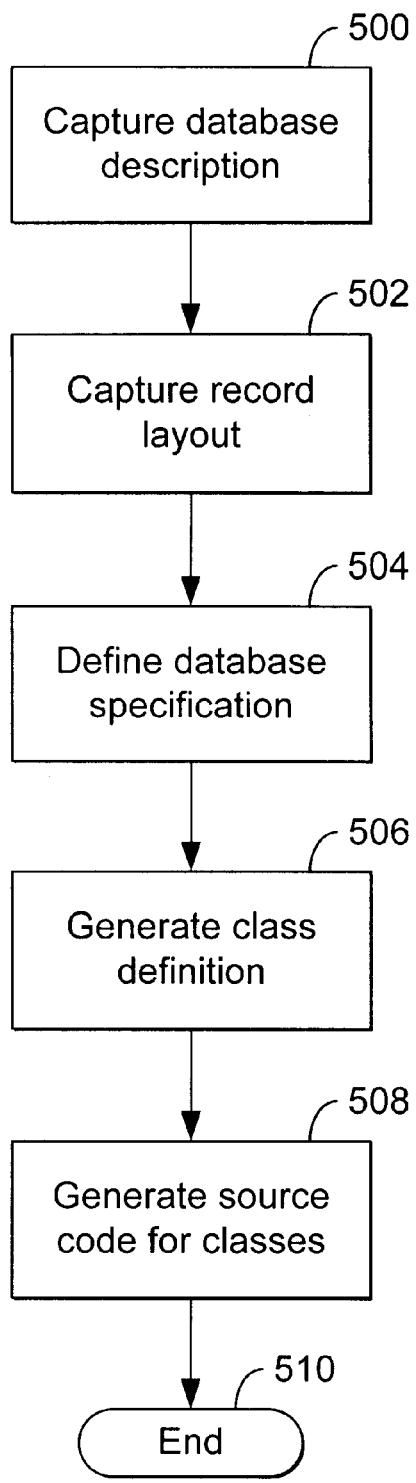
FIG. 5 is a flowchart illustrating the logic performed by the Class Definition Tool according to the present invention.

FIG. 4 is a block diagram illustrating the structure of a Class Definition Tool (CDT) 400 according to the present invention, and FIG. 5 is a flowchart illustrating the logic performed by the CDT 400 according to the present invention. The CDT 400 executes under the control of the operating system on the client computer 100, interacts with an operator via a Graphical User Interface (GUI) 402, and stores information in a catalog 404.

To minimize the need for writing non-object-oriented code to access the database 112, the object classes and methods used in the objects framework 108 are generated by the CDT 400. Generally, these classes and methods are typically generated as C++ source code, although other programming languages could be used as well. Using the object framework 108 as its runtime component, the application program 106 instantiates objects for these classes and directs the retrieval of data from the database 112 into the instantiated objects.

A database definer function 406 of the CDT 300 captures information from a database description (500) and the record layout for the database 112 (502), and associates them to one another to define a database specification (504), which is subsequently stored in the catalog 404.

The database descriptions and record layouts accessed by the CDT 400 are typically located on the server computer 102. The database description includes information about the structure of the segments in the database 112 and the record layouts include formatting information for the records in the database 112.

Generally, the database definer function 406 can either be done automatically by the CDT 400 or in response to commands from a Database Administrator (DBA). The resulting database specification contains the relevant information extracted from the database description and the record layout, and links the database description and record layout together. The database definer function 406 may further perform an augment function that captures additional information to assist in defining the database specification.

A class definer function 408 of the CDT 400 uses the database specification in the catalog 404 and operator input to generate class definitions for the various objects (506), which are then stored in the catalog 404. The class definer function 408 may further perform an augment function that captures additional information to assist in generating the class definitions and to constrain the use of the resulting objects.

A class generator function 410 of the CDT 400 uses the class definitions to generate source code (508), which includes both class and method implementations. The source code generated by the CDT 400 is compiled, linked, and made available in executable form at run-time as the objects framework 108 on the server computer 102.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrapper the data retrieved from the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for accessing a hierarchical database, comprising:
   (a) modeling the database into an objects framework, wherein the objects framework is comprised of one or more objects selected from a group comprising a root object, an application view object, a database definition view object, a data object, a business logic object, and an iterator object; and
   (b) accessing the database through the objects framework.

2. The method of claim 1, wherein the objects framework comprises a C++ class library that interfaces to an application program.

3. The method of claim 2, wherein the application program dynamically loads previously defined objects into the objects framework to access the database during execution time.

4. The method of claim 1, wherein the application view object corresponds to an application view, the database definition view object corresponds to a database definition, and the data object corresponds to data defined and stored in the database.

5. The method of claim 1, further comprising organizing the objects into a tree structure to represent a hierarchical structure of data retrieved from the database.

6. The method of claim 5, wherein the tree structure ensures that there is exactly one path through the hierarchy to each object and consequently exactly one identity for an object.

7. The method of claim 6, wherein the identity for an object comprises a segment occurrence.

8. The method of claim 1, wherein the root object comprises a root for a collection of application views.

9. The method of claim 1, wherein the application view object manages a collection of database definition view objects.

10. The method of claim 1, wherein the application view object evaluates queries for the database.

11. The method of claim 1, wherein the application view object creates a segment search argument list for the evaluated query.

12. The method of claim 1, wherein the database description view object includes information about the structure of the database.

13. The method of claim 1, wherein the database description view object defines the hierarchy to help locate segments for the database.

14. The method of claim 1, wherein the database description view object manages a collection of objects selected from a group comprising data objects (DOs) and business objects (BOs).

15. The method of claim 1, wherein the data object class represents a segment type in the database and the data object represents a segment occurrence in the database.

16. The method of claim 15, wherein the data object provides a direct mapping of the data within the segment occurrence.

17. The method of claim 15, wherein an application program directly accesses the data in the segment occurrence by interacting with the data object.

18. The method of claim 1, wherein the business object provides business logic for an application program.

19. The method of claim 1, wherein the business object invokes one or more methods of a corresponding data object to perform the necessary operations on the database.

20. The method of claim 1, wherein the data object isolates the business object from specifics of the database.

21. The method of claim 1, wherein the iterator object points to an incrementally materialized collection of business objects and data objects.

22. The method of claim 1, wherein the iterator object instantiates the business objects and data objects.

23. A computerized apparatus for accessing a hierarchical database, comprising:
   (a) means for modeling the database into an objects framework, wherein the objects framework is comprised of one or more objects selected from a group comprising a root object, an application view object, a database definition view object, a data object, a business logic object, and an iterator object; and
   (b) means for accessing the database through the objects framework.

24. The apparatus of claim 23 wherein the objects framework comprises a C++ class library that interfaces to an application program.

25. The apparatus of claim 24, wherein the application program comprises means for dynamically loading previously defined objects into the objects framework to access the database during execution time.

26. A program storage medium readable by a computer, the medium embodying one or more instructions executable by the computer to perform method steps for accessing a hierarchical database, the method comprising:
   (a) modeling the database into an objects framework, wherein the objects framework is comprised of one or more objects selected from a group comprising a root object, an application view object, a database definition view object, a data object, a business logic object, and an iterator object; and
   (b) accessing the database through the objects framework.

27. The apparatus of claim 26, wherein the application view object corresponds to an application view, the database definition view object corresponds to a database definition, and the data object corresponds to data defined and stored in the database.

28. The apparatus of claim 26, further comprising means for organizing the objects into a tree structure to represent a hierarchical structure of data retrieved from the database.

29. The apparatus of claim 28, wherein the tree structure comprises means to ensure that there is exactly one path through the hierarchy to each object and consequently exactly one identity for an object.

30. The apparatus of claim 29, wherein the identity for an object comprises a segment occurrence.

31. The apparatus of claim 24, wherein the root object comprises a root for a collection of application views.

32. The apparatus of claim 24, wherein the application view object comprises means for managing a collection of database definition view objects.

33. The apparatus of claim 24, wherein the application view object comprises means for evaluating queries for the database.

34. The apparatus of claim 24, wherein the application view object comprises means for creating a segment search argument list for the evaluated query.

35. The apparatus of claim 24, wherein the database description view object includes information about the structure of the database.

36. The apparatus of claim 24, wherein the database description view object comprises means for defining the hierarchy to help locate segments for the database.

37. The apparatus of claim 24, wherein the database description view object comprises means for managing a collection of objects selected from a group comprising data objects (DOs) and business objects (BOs).

38. The apparatus of claim 24, wherein the data object class comprises means for representing a segment type in the database and the data object represents a segment occurrence in the database.

39. The apparatus of claim 38, wherein the data object comprises means for providing a direct mapping of the data within the segment occurrence.

40. The apparatus of claim 38, wherein an application program comprises means for directly accessing the data in the segment occurrence by interacting with the data object.

41. The apparatus of claim 24, wherein the business object comprises means for providing business logic for an application program.

42. The apparatus of claim 24, wherein the business object comprises means for invoking one or more methods of a corresponding data object to perform the necessary operations on the database.

43. The apparatus of claim 24, wherein the data object comprises means for isolating the business object from specifics of the database.

44. The apparatus of claim 24, wherein the iterator object comprises means for pointing to an incrementally materialized collection of business objects and data objects.

45. The apparatus of claim 24, wherein the iterator object comprises means for instantiating the business objects and data objects.

46. The program storage medium of claim 24, wherein the objects framework comprises a C++ class library that interfaces to an application program.

47. The program storage medium of claim 46, wherein the application program dynamically loads previously defined objects into the objects framework to access the database during execution time.

48. The program storage medium of claim 46, wherein the application view object corresponds to an application view, the database definition view object corresponds to a database definition, and the data object corresponds to data defined and stored in the database.

49. The program storage medium of claim 46, wherein the method further comprises organizing the objects into a tree structure to represent a hierarchical structure of data retrieved from the database.

50. The program storage medium of claim 49, wherein the tree structure ensures that there is exactly one path through the hierarchy to each object and consequently exactly one identity for an object.

51. The program storage medium of claim 50, wherein the identity for an object comprises a segment occurrence.

52. The program storage medium of claim 46, wherein the root object comprises a root for a collection of application views.

53. The program storage medium of claim 46, wherein the application view object manages a collection of database definition view objects.

54. The program storage medium of claim 46, wherein the application view object evaluates queries for the database.

55. The program storage medium of claim 46, wherein the application view object creates a segment search argument list for the evaluated query.

56. The program storage medium of claim 46, wherein the database description view object includes information about the structure of the database.

57. The program storage medium of claim 46, wherein the database description view object defines the hierarchy to help locate segments for the database.

58. The program storage medium of claim 46, wherein the database description view object manages a collection of objects selected from a group comprising data objects (DOs) and business objects (BOs).

59. The program storage medium of claim 46, wherein the data object class represents a segment type in the database and the data object represents a segment occurrence in the database.

60. The program storage medium of claim 59, wherein the data object provides a direct mapping of the data within the segment occurrence.

61. The program storage medium of claim 59, wherein an application program directly accesses the data in the segment occurrence by interacting with the data object.

62. The program storage medium of claim 46, wherein the business object provides business logic for an application program.

63. The program storage medium of claim 46, wherein the business object invokes one or more methods of a corresponding data object to perform the necessary operations on the database.

64. The program storage medium of claim 46, wherein the data object isolates the business object from specifics of the database.

65. The program storage medium of claim 46, wherein the iterator object points to an incrementally materialized collection of business objects and data objects.

66. The program storage medium of claim 46, wherein the iterator object instantiates the business objects and data objects.

* * * * *

UNITED STATES PATENT AND TRADEMARK OFFICE
CERTIFICATE OF CORRECTION

PATENT NO.     : 6,202,069 B1
DATED          : March 13, 2001
INVENTOR(S)    : Kenneth Ray Blackman, Shyh-Mei Fang Ho and Thomas Beavers Sander It is certified that error appears in the above-identified patent and that said Letters Patent is hereby corrected as shown below:

<u>Title page,</u>
Item [56], References Cited, OTHER PUBLICATIONS, Cross, references "...Framwork..." should read -- Framework --

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,202,069 B1                                                                                   Page 1 of 1
DATED        : March 13, 2001
INVENTOR(S)  : Kenneth Ray Blackman, Shyh-Mei Fang Ho and Thomas Beavers Sander It is certified that error appears in the above-identified patent and that said Letters Patent is hereby corrected as shown below:

Column 12,
Lines 37 and 42, "26" should read -- 23 --; and
Lines 51, 53, 56, 59, 62 and 65, "24" should read -- 23 --.

Column 13,
Lines 1, 5, 15, 18 and 22, "24" should read -- 23 --.
Lines 25, 28, 31, 38 and 43, "24" should read -- 26 --.

Column 14,
Lines 3, 6, 9, 11, 14, 17, 20, 24, 33, 36, 40, 43 and 46, "46" should read -- 26 --.

Signed and Sealed this

Twenty-third Day of September, 2003

JAMES E. ROGAN
*Director of the United States Patent and Trademark Office*